US007137288B2

(12) United States Patent
Kobayashi et al.

(10) Patent No.: US 7,137,288 B2
(45) Date of Patent: Nov. 21, 2006

(54) FUEL VAPOR LEAK CHECK MODULE

(75) Inventors: Mitsuyuki Kobayashi, Gamagori (JP); Hitoshi Amano, Okazaki (JP); Seiji Kunihiro, Kariya (JP); Masafumi Tsuruta, Handa (JP)

(73) Assignee: Denso Corporation (JP)

( * ) Notice: Subject to any disclaimer, the term of this patent is extended or adjusted under 35 U.S.C. 154(b) by 145 days.

(21) Appl. No.: 10/922,999

(22) Filed: Aug. 23, 2004

(65) Prior Publication Data

US 2005/0044937 A1 Mar. 3, 2005

(30) Foreign Application Priority Data

Aug. 25, 2003 (JP) ............................ 2003-300158
Aug. 25, 2003 (JP) ............................ 2003-300159
Aug. 25, 2003 (JP) ............................ 2003-300160

(51) Int. Cl.
*G01M 3/04* (2006.01)

(52) U.S. Cl. ...................................... 73/49.7; 73/118.1

(58) Field of Classification Search .................... 73/40, 73/46, 47, 49.7, 116, 117.2, 117.3, 118.1, 73/119 R See application file for complete search history.

(56) References Cited

U.S. PATENT DOCUMENTS 5,894,474 A 4/1999 Maison et al.
6,820,467 B1 * 11/2004 Streib ........................ 73/49.2
6,834,535 B1 * 12/2004 Kano et al. .................. 73/49.7
2003/0051541 A1 * 3/2003 Kano et al. ................ 73/118.1

OTHER PUBLICATIONS

U.S. Appl. No. 10/911,555, filed Aug. 25, 2004 titled, "Fuel Vapor Leak Check Module" Inventor: Kobayashi et al.
U.S. Appl. No. 10/911,555, filed Aug. 2004, Kobayashi et al.
U.S. Appl. No. 10/923,005, filed Aug. 2004, Tsuruta et al.
U.S. Appl. No. 10/923,774, filed Aug. 2004, Kobayashi et al.
U.S. Appl. No. 10/923,786, filed Aug. 2004, Kano et al.

* cited by examiner

*Primary Examiner*—Eric S. McCall
(74) *Attorney, Agent, or Firm*—Nixon & Vanderhye PC

(57) ABSTRACT

A fuel vapor leakage check module has a canister port which is provided so that the port can be opened to the air and is connected to the interior of a fuel tank through a canister for absorbing fuel vapor produced in the fuel tank. A pump depressurizes or pressurizes the interior of the fuel tank through the canister port. A connecting passage which is coaxially provided in the canister port, is connected to the canister port. The connecting passage is depressurized or pressurized by the pump. A standard orifice is coaxially provided in the connecting passage and reduces the passage area of the connecting passage.

13 Claims, 7 Drawing Sheets

FUEL VAPOR LEAK CHECK MODULE

CROSS REFERENCE TO RELATED APPLICATION

This application is based on Japanese Patent Applications No. 2003-300158 filed on Aug. 25, 2003, No. 2003-300159 filed on Aug. 25, 2003, and No. 2003-300160 filed on August 25, the disclosures of which are incorporated herein by reference.

FIELD OF THE INVENTION

The present invention relates to a fuel vapor leakage check module for inspecting the leakage of fuel vapor from a fuel tank which can occur in fuel tanks.

BACKGROUND OF THE INVENTION

From the viewpoint of environmental protection, emission control of fuel vapor which can leak from fuel tanks to the outside has been recently strengthened as well as control of emission gas from engines mounted in vehicles. Especially, the standards laid down by the Environmental Protection Agency (EPA) and the California Air Resources Board (CARB) require that fuel vapor leaking from a minute opening in a fuel tank should be detected. For this purpose, a fuel vapor leakage check module is in wide use. The module is so designed that the interior of a fuel tank connected to a canister port through a canister is pressurized or depressurized and thereby any leakage of fuel vapor from the fuel tank is inspected. (U.S. Pat. No. 5,890,474 for example.)

Conventionally, various methods have been developed for the enhancement of the detection accuracy of fuel vapor leakage check modules. For example, a standard orifice corresponding to the aperture diameter for which fuel vapor leakage is allowed in a fuel tank is depressurized or pressurized to detect a standard pressure; thereafter, the interior of the fuel tank is depressurized or pressurized to detect its pressure, and the detected pressure is compared with the standard pressure to inspect fuel vapor leakage. FIG. 5 illustrates a fuel vapor leakage check module for implementing this method. The check module 1 in FIG. 5 is so constructed that: a standard orifice 5 is provided in a passage 4 connecting to a canister port 3 which can be opened to the air by a changeover valve 2; the passage 4 is depressurized or pressurized by a pump means 6.

SUMMARY OF THE INVENTION

However, conventional check modules 1 have a problem. In the canister port 3, the axis N of the passage 4 is eccentric with respect to the axis O of a passage portion 3*a* which encircles the passage 4. For this reason, when the passage 4 is depressurized, the flow of air flowing from the canister port 3, opened to the air as illustrated in FIG. 5, into the passage 4 becomes uneven in the direction of the circumference of the passage 4. When the passage 4 is pressurized, similarly, the flow of air flowing from the passage 4 out to the canister port 3 open to the air becomes uneven in the direction of the circumference of the passage 4. When the flow of air becomes uneven in the direction of the circumference of the passage 4, as mentioned above, the flow of air passing through the standard orifice 5 also becomes uneven in the direction of the circumference of the standard orifice 5. As a result, the detected value of standard pressure becomes inaccurate, and the detection accuracy for fuel vapor leakage is degraded.

An object of the present invention is to provide a fuel vapor leakage check module which enhances the detection accuracy for fuel vapor leakage.

According to the present invention, a connecting passage connecting to a canister port which can be opened to the air is coaxially provided in the canister port. Thus, the flow of air flowing from the canister port open to the air into the connecting passage is uniformized in the direction of the circumference of the connecting passage by depressurization in the connecting passage. Further, the flow of air flowing from the connecting passage out to the canister port open to the air is uniformized in the direction of the circumference of the connecting passage by pressurization in the connecting passage. Thus, the flow of air passing through the standard orifice coaxially provided in the connecting passage is also uniformized in the direction of the circumference of the standard orifice. Therefore, the standard pressure can be detected with accuracy by depressurizing or pressurizing the connecting passage and thus the standard orifice. As a result, the detection accuracy for fuel vapor leakage is enhanced.

Figure 1:
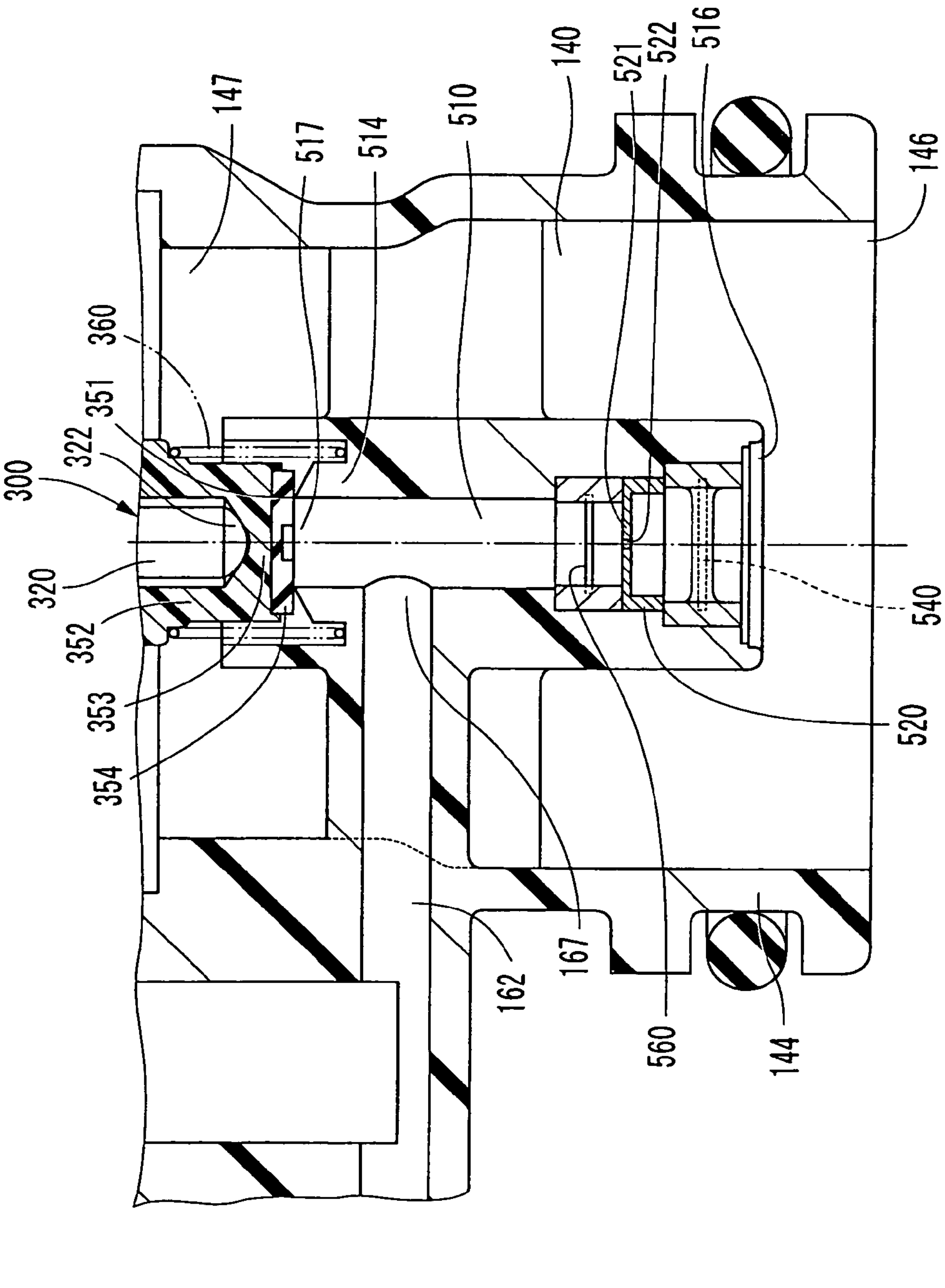
FIG. 1 is an enlarged cross-sectional view illustrating the substantial part of a check module in an embodiment of the present invention.

DETAILED DESCRIPTION OF THE PREFERRED EMBODIMENTS (First Embodiment)

Referring to the drawings, the embodiments of the present invention will be described below.

Figure 2:
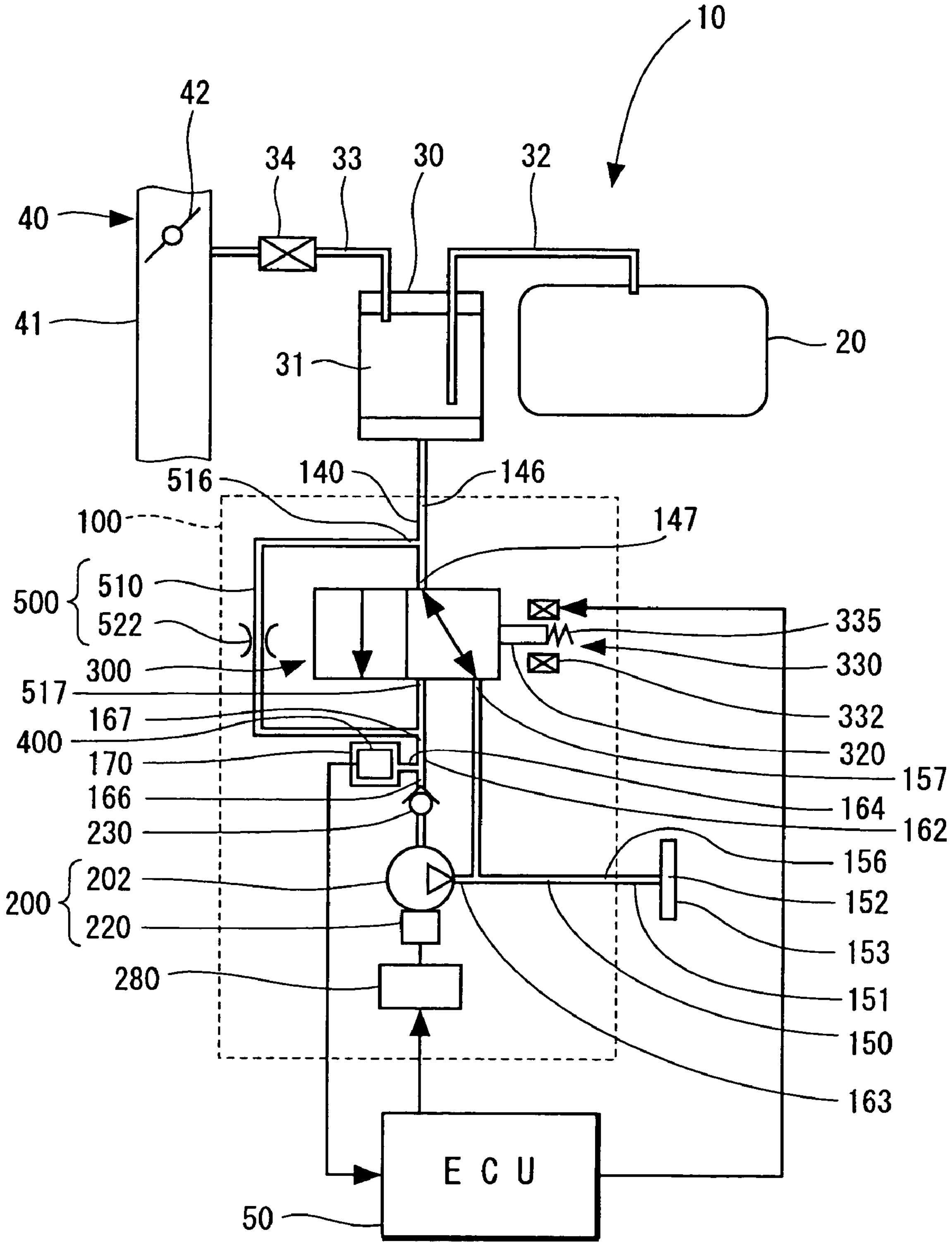
FIG. 2 is a schematic diagram illustrating a check system to which the check module in the embodiment of the present invention is applied.

FIG. 2 illustrates a fuel vapor leakage check system (hereafter, simply referred to as "check system") to which the fuel vapor leakage check module (hereafter, simply referred to as "check module") in an embodiment of the present invention is applied.

The check system 10 comprises the check module 100, a fuel tank 20, a canister 30, an intake system 40, ECU 50, and the like.

Figure 3:
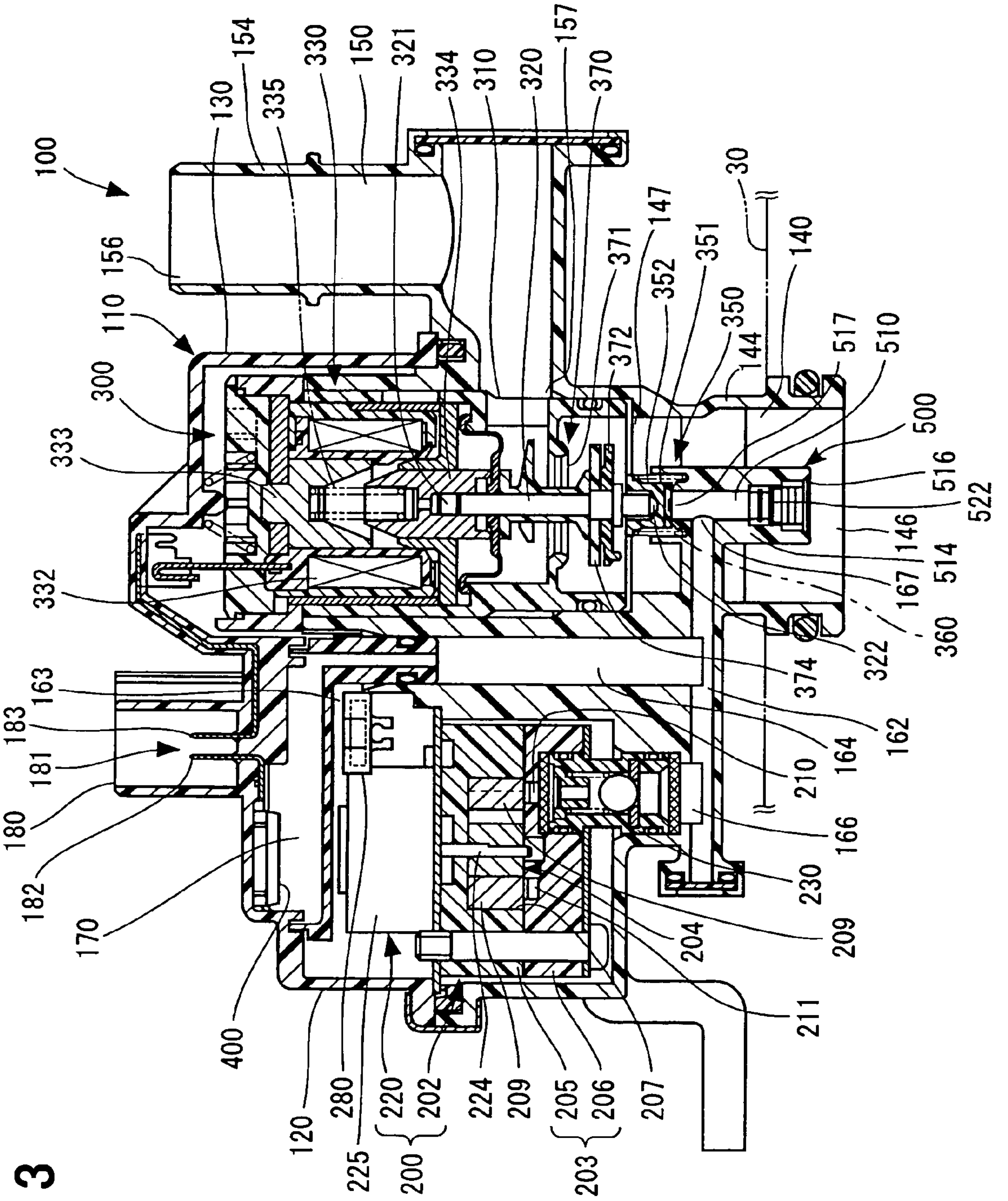
FIG. 3 is a cross-sectional view of the check module in the embodiment of the present invention.

As illustrated in FIG. 3, the check module 100 comprises a housing 110, a vane pump 200, a changeover valve 300, and a pressure sensor 400.

The housing 100 is provided with a connector 180. The terminal block 181 of the connector 180 is connected with a coupler (not shown) supplied with power from a power supply (not shown) through the ECU 50. The terminal block 181 of the connector 180 includes: a terminal 182 connected with the pressure sensor 400; a terminal 183 connected with the coil 332 of the changeover valve 300; and a terminal (not shown) connected with the control circuit portion 280 of the motor portion 220 of the vane pump 200.

The housing 110 comprises a pump housing portion 120 for housing the vane pump 200, and a changeover valve housing portion 130 for housing the change over valve 300. The housing 110 further comprises a canister port 140 and an air port 150. The port wall 144 of the canister port 140 is cylindrically formed by integral resin molding together with the port wall 154 of the air port 150. One end 146 of the canister port 140 constructs a connecting end portion 146 to be connected with the canister 30. As illustrated in FIG. 2, one end 156 of the air port 150 is connected with an air passage 151. The air passage 151 has, at its counter-air port-side end, an open end 153 where an air filter 152 is installed. Thus, the end 156 of the air port 150 constructs the open end portion 156 which is opened to the air through the air passage 151. As illustrated in FIG. 3, the counter-connecting end portion-side end 147 of the canister port 140 and the counter-open end portion-side end 157 of the air port 150 are connected with the changeover valve 300. The canister port 140 can be opened to the air through the air port 150 and the air passage 151 by the changeover operation of the changeover valve 300.

The housing 110 further comprises a pump passage 162, an exhaust passage 163, a pressure introduction passage 164, and a sensor chamber 170. One end 166 of the pump passage 162 is connected with the pump portion 202 of the vane pump 200. The counter-pump portion-side end 167 of the pump passage 162 is connected with a mid part of a connecting passage 510 to be described later. The exhaust passage 163 connects the pump portion 202 and the air port 150. The pressure introduction passage 164 is branched at a mid part of the pump passage 162, and its counter-pump passage-side end is connected with the sensor chamber 170.

The housing 110 is further provided with an orifice portion 500. As illustrated in FIG. 1, the orifice portion 500 comprises the connecting passage 510, an orifice member 520, and filters 540 and 560.

The connecting passage 510 is coaxially placed in the canister port 140. More specifically, the passage wall 514 of the connecting passage 510 is cylindrically formed integrally and coaxially with the port wall 144 of the canister port 140 by resin molding. That is, the housing 110 has a coaxial double cylindrical portion wherein the passage wall 514 is taken as an inner cylinder and the port wall 144 is taken as an outer cylinder. The housing 110 has the connecting passage 510 and the canister port 140 coaxially formed inside and outside the passage wall 514, respectively. One end 516 of the connecting passage 510 constructs the open end 516 which is open in and connects to the canister port 140. The opening of the open end 516 faces the same side as the opening of the connecting end portion 146 of the canister port 140 does. The counter-open end-side end 517 of the connecting passage 510 is connected with the changeover valve 300. At a mid part between both the ends 516 and 517 of the connecting passage 510, the pump passage 162 is branched from the orifice member 520 between the standard orifice 522 and on the changeover valve.

The orifice member 520 is installed at a mid part between both the ends 516 and 517 of the connecting passage 510. The orifice member 520 is formed of metal in the shape of closed-end cylinder, and its position is fixed in the connecting passage 510. On the bottom wall 521 of the orifice member 520, the standard orifice 522 which reduces the passage area of the connecting passage 510 is formed coaxially with the connecting passage 510. The diameter of the standard orifice 522 corresponds to the aperture diameter for which the leakage of air containing fuel vapor is allowed in the fuel tank 20. For example, the CARB and EPA standards require the detection of air leakage from an opening equivalent to ϕ0.5 mm with respect to the detection accuracy for the leakage of air containing fuel vapor from a fuel tank 20. Therefore,this embodiment adopts a diameter not more than ϕ0.5 mm for the standard orifice 522.

Both the filters 540 and 560 are constructed of a thin flat metal mesh filter. One filter 540 is provided in the connecting passage 510 between the standard orifice 522 and the open end, and filters air passing through the connecting passage 510 from the open end side to the standard orifice side. The other filter 560 is provided in the connecting passage 510 between the standard orifice 522 and the branching point of the pump passage 162, and filters air passing through the connecting passage 510 from the changeover valve side to the standard orifice side.

As illustrated in FIG. 3, the pump portion 202 of the vane pump 200 comprises a casing 203, a rotor 204, and a check valve 230. The casing 203 is formed by combining a cam ring 205 and a plate 206 and is installed in the pump housing portion 120. The casing 203 houses the rotor 204 in a pump chamber 207 formed therein. The rotor 204 is eccentrically installed with respect to the pump chamber 207, and is rotatable on the eccentric axis. The rotor 204 has a plurality of vanes 209 which are slid on the inner circumferential wall of the casing 203 by centrifugal force produced by the rotational driving of the rotor.

The casing 203 has an intake port 210 and an exhaust port 211 formed therein. One end of the intake port 210 is connected with the pump chamber 207, and the counter-pump chamber-side end of the intake port 210 is connected with the end 166 of the pump passage 162 through the check valve 230 fit in the end. The check valve 230 operates as follows: when the rotor 204 is rotationally driven, the valve is opened to connect the intake port 210 and the pump passage 162; and when the rotor 204 is not driven, the valve separates the intake port 210 and the pump passage 162 from each other. One end of the exhaust port 211 is connected with the pump chamber 207, and the counter-pump chamber-side end of the exhaust port 211 is connected with the exhaust passage 163.

The motor portion 220 of the vane pump 200 is constructed of a brushless direct-current motor. The motor portion 220 comprises a rotating shaft 224, an energizing and driving portion 225, and the control circuit portion 280. The rotating shaft 224 penetrates the casing 203, and is coupled with and fixed on the rotor 204 in the pump chamber 207. When the position in which a coil (not shown) is energized is changed, the energizing and driving portion 225 rotationally drives a mover (not shown) attached to the rotating shaft 224. The control circuit portion 280 is connected with the coil of the energizing and driving portion 225. The control circuit portion 280 controls the position in which the coil is energized, and thereby drives the rotating shaft 224 and thus the rotor 204 at a predetermined number of revolutions. When the rotor 204 is rotationally driven, air is taken from the intake port 210 in the pump portion 202 into the pump chamber 207, and the air is compressed by the operation of the vanes 209 and exhausted from the exhaust port 211 into the exhaust passage 163. The pump passage 162 and the connecting passage 510 are depressurized in sequence by this operation, and the interior of the fuel tank 20 connected to the canister 30 is depressurized through the canister port 140 connecting to the connecting passage 510.

Thus, the vane pump 200 and the pump passage 162 construct the pump means in the present invention.

As illustrated in FIG. 2, the changeover valve 300 selects the end 517 of the connecting passage 510 or the end 157 of the air port 150 by its changeover operation, and connects it to the end 147 of the canister port 140. More specifically, as illustrated in FIG. 3, the changeover valve 300 comprises a valve body 310, a shaft body 320, an electromagnetic driving portion 330, a first valve portion 350, an elastic member 360, and a second valve portion 370.

The valve body 310 is formed of resin, and is held in the changeover valve housing portion 130. The shaft body 320 is housed in the valve body 310 so that the shaft body is coaxial with the connecting passage 510 and can be reciprocated in the axial direction.

The electromagnetic driving portion 330 comprises the coil 332, a fixed core 333, a movable core 334, an energizing member 335, and the like. The coil 332 is connected with the ECU 50, and the coil 332 is intermittently energized by the ECU 50. The fixed core 333 and the movable core 334 are formed of magnetic material, and face each other in the direction of the axis of the shaft body 320. The position of the fixed core 333 is fixed in the valve body 310. The movable core 334 is attached to the counter-connecting passage side-end 321 of the shaft body 320, and is capable of reciprocating together with the shaft body 320. The energizing member 335 is constructed of a helical compression spring, and installed between the fixed core 333 and the movable core 334. The energizing member 335 energizes the movable core 334 and the shaft body 320 toward the connecting passage by restoring force produced by compressive deformation.

As illustrated in FIG. 1, the first valve portion 350 is formed by combining a first valve seat 351 and a first valve element 352. The first valve seat 351 is integrally formed on the passage wall 514 which encircles the end 517 of the connecting passage 510. The first valve element 352 is formed of resin in the shape of closed-end cylinder. The connecting passage-side end 322 of the shaft body 320 is fit in the first valve element 352. Thus, the first valve element 352 is capable of reciprocating together with the shaft body 320, and can be seated on the first valve seat 351 through a cushioning member 354 attached to its bottom wall 353.

The elastic member 360 is constructed of a helical compression spring, and is placed between the passage wall 514 which encircles the end 517 of the connecting passage 510 and the first valve element 352. The elastic member 360 constructed of a helical compression spring is installed coaxially with the connecting passage 510 and the shaft body 320. The elastic member 360 exerts restoring force produced by compressive deformation on the first valve element 352, and thereby presses the bottom wall 353 of the first valve element 352 against the end 322 of the shaft body 320. In this embodiment, the restoring force of the elastic member 360 which is maximized when the coil 332 is not energized is smaller than the restoring force of the energizing member 335 which is minimized at that time.

As illustrated in FIG. 3, the second valve portion 370 is formed by combining a second valve seat 371 and a second valve element 372. The second valve seat 371 is integrally formed on the valve body 310 in proximity to the end 157 of the air port 150. The second valve element 372 is formed of resin in the shape of annular plate. A mid part of the shaft body 320 is attached to the inner radius side of the second valve element 372. Thus, the second valve element 372 is capable of reciprocating together with the shaft body 320, and can be seated on the second valve seat 371 through a cushioning member 374 attached to its counter-first valve element side.

When the coil 332 is not energized, magnetic attractive force is not produced between the fixed core 333 and the movable core 334. Therefore, the shaft body 320 is moved toward the connecting passage side (downward in FIG. 3) by the restoring force of the energizing member 335. At this time, the first valve element 352 is seated on the first valve seat 351, and thus the end 147 of the canister port 140 and the end 517 of the connecting passage 510 are separated from each other. Further, at this time, the second valve element 372 is unseated from the second valve seat 371, and thus the canister port 140 and the air port 150 are connected to each other between the ends 147 and 157. When the coil 332 is energized, magnetic attractive force is produced between the fixed core 333 and the movable core 334. Therefore, the shaft body 320 is moved toward the counter-connecting passage side (upward in FIG. 3) against the restoring force of the energizing member 335. At this time, the first valve element 352 is unseated from the first valve seat 351, and the canister port 140 and the connecting passage 510 are connected to each other between the ends 147 and 517. Further, at this time, the second valve element 372 is seated on the second valve seat 371, and thus the end 147 of the canister port 140 and the end 157 of the air port 150 are separated from each other. The canister port 140 and the pump passage 162 are constantly connected to each other through the path which goes through the standard orifice 522 in the connecting passage 510.

The pressure sensor 400 is installed in the sensor chamber 170. The pressure sensor 400 detects the pressure in the sensor chamber 170, and outputs a signal corresponding to the detected pressure to the ECU 50. The sensor chamber 170 is connected to the pump passage 162 through the pressure introduction passage 164. Therefore, the pressure detected by the pressure sensor 400 is substantially identical with the pressure in the pump passage 162.

As illustrated in FIG. 2, the canister 30 is connected to the fuel tank 20 through a tank passage 32. Therefore, the canister port 140 is connected to the interior of the fuel tank 20 through the canister 30. The canister 30 contains absorbent 31 composed of activated carbon or the like, and makes fuel vapor produced in the fuel tank 20 absorbed to the absorbent 31. For this reason, the concentration of fuel vapor contained in air flowing out from the canister 30 is lowered to a predetermined value or below. The intake system 40 has an intake pipe 41 which is connected to the air intake system of the engine. In the intake pipe 41, a throttle valve 42 is installed which regulates the flow rate of intake air flowing therein. The intake pipe 41 and the canister 30 are connected with each other through a purge passage 33. In the purge passage 33, a purge valve 34 is installed which opens and closes the purge passage 33 according to instructions from the ECU 50.

The ECU 50 is constructed of a microcomputer (not shown) including CPU, ROM, RAM, and the like. The ECU 50 controls the check module 100 and each part of the vehicle mounted with the check module 100. The ECU 50 is fed with output signals from various sensors, including the pressure sensor 400, installed in various parts of the vehicle. Based on these inputted signals, the ECU 50 controls each part according to predetermined control programs recorded in the ROM. The ECU 50 also controls the operation of the motor portion 220, changeover valve 300, and the like.

Next, description will be given to the operation of the check module 100 in the check system 10.

Inspection by the check module 100 is not carried out until a predetermined time period passes after the operation of the engine mounted in the vehicle is stopped.

(1) When the predetermined time period has passed after the operation of the engine is stopped, the atmospheric pressure is detected by the pressure sensor 400 prior to air leakage check. At this time, the coil 332 of the changeover valve 300 is not energized, and the first valve element 352 is seated on the first valve seat 351 and the second valve element 372 is unseated from the second valve seat 371. Thus, the end 147 of the canister port 140 and the end 517 of the connecting passage 510 are separated from each other, and the canister port 140 and the air port 150 are connected to each other between the ends 147 and 157. For this reason, the air port 150 is connected to the pump passage 162 through the canister port 140 and the standard orifice 522 in the connecting passage 510. Therefore, the pressure sensor 400 in the sensor chamber 170 connecting to the pump passage 162 detects the pressure substantially identical with the atmospheric pressure. At this time, only the pressure sensor 400 is energized, and energization of the motor portion 220 and the changeover valve 300 is stopped. This state is designated as atmospheric pressure detection period A, as illustrated in FIG. 4.

(2) When the detection of the atmospheric pressure is completed, the altitude of the position in which the vehicle is in a stop is computed from the detected atmospheric pressure by the ECU 50. When the computation of altitude is completed, energization of the coil 332 of the changeover valve 300 is started, and the produced fuel vapor detection state B illustrated in FIG. 4 is established. As the result of energization of the coil 332, the second valve element 372 is seated on the second valve seat 371, and at the same time, the first valve element 352 is unseated from the first valve seat 351. Thus the end 147 of the canister port 140 and the end 157 of the air port 150 are separated from each other, and further the canister port 140 and the connecting passage 510 are connected to each other between the ends 147 and 517. As a result,the pump passage 162 is disconnected from the air port 150, and is connected to the canister port 140 in the path which does not go through the standard orifice 522 and connected to the interior of the fuel tank 20. When fuel vapor is produced in the fuel tank 2, the pressure in the fuel tank 20 is higher than the pressure around the vehicle, that is, the atmospheric pressure. Then, the pressure detected by the pressure sensor 400 rises as illustrated in FIG. 4.

Figure 4:
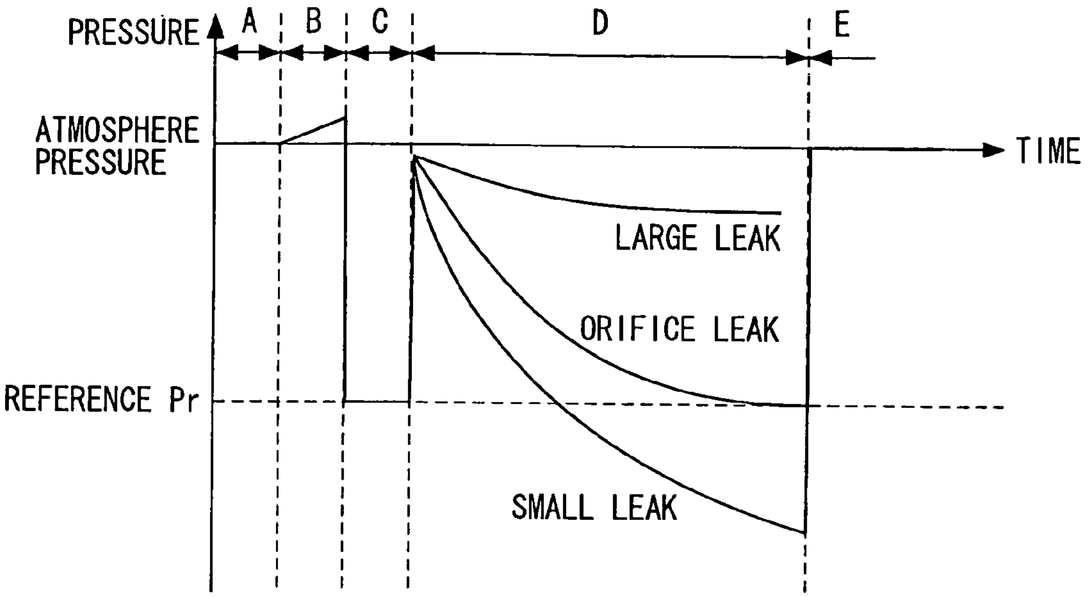
FIG. 4 is a schematic diagram illustrating pressure change detected by the pressure sensor of the check module in the embodiment of the present invention.
Figure 5:
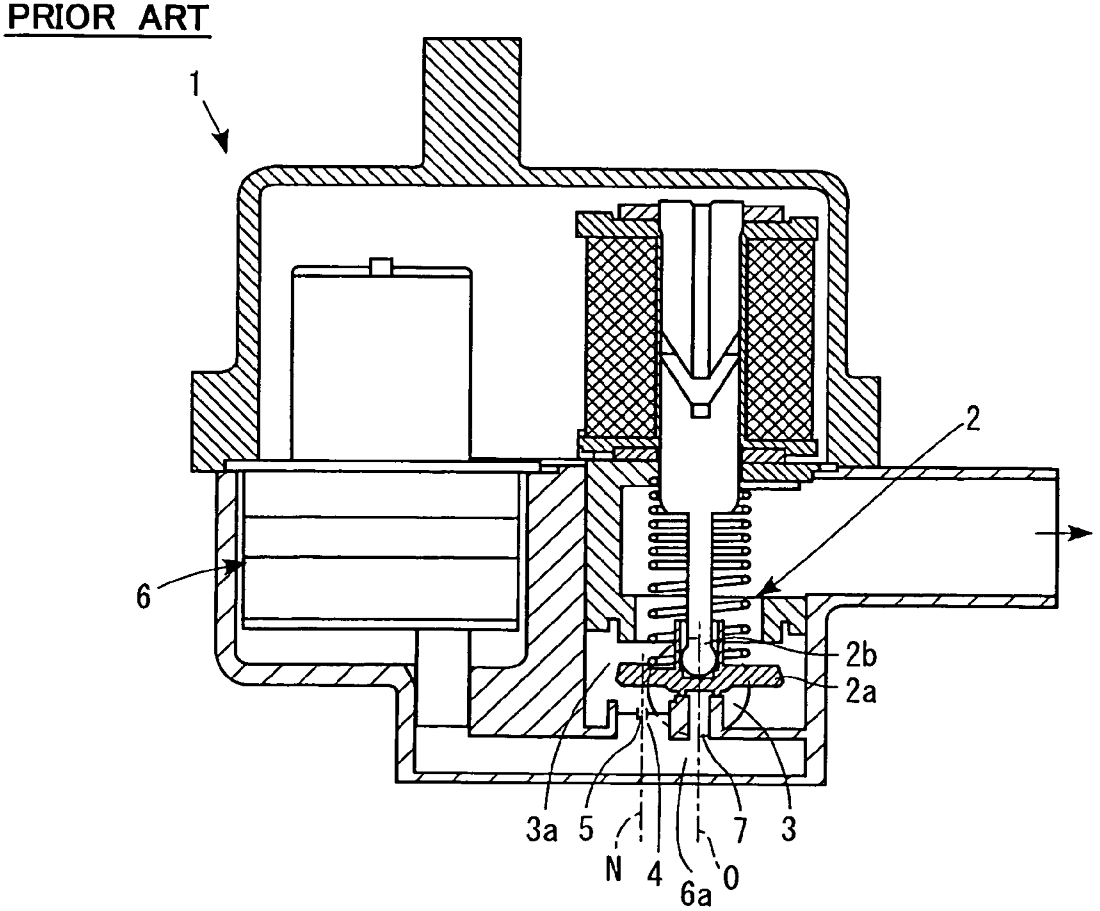
FIG. 5 PRIOR ART
FIG. 5 is a cross-sectional view of a conventional fuel vapor leakage check module.

(3) When pressure rise is detected in the fuel tank 20, energization of the coil 332 of the changeover valve 300 is stopped, and the standard detection state C illustrated in FIG. 4 is established. As the result of stopping energization of the coil 332, the end 147 of the canister port 140 and the end 517 of the connecting passage 510 are separated from each other as in the step described under above. At the same time, the canister port 140 and the air port 150 are connected to each other between the ends 147 and 157. Thus, the air port 150 is connected to the pump passage 162 through the canister port 140 and the standard orifice 522 in the connecting passage 510. When energization of the energizing and driving portion 225 of the motor portion 220 is thereafter started, the rotor 204 of the pump portion 202 is rotationally driven. Therefore,the check valve 230 is opened, and the pump passage 162 and the connecting passage 510 are depressurized. As the result of this depressurization, air which has flown from the air port 150 into the canister port 140 flows from the canister port 140 into the connecting passage 510 through the open end 516. At the same time, air containing fuel vapor which has flown from the canister 30 into the canister port 140 also flows from the canister port 140 into the connecting passage 510 through the open end 516. Further, the air flowing into the connecting passage 510 is guided to the depressurized standard orifice 522 and undergoes squeezing action there, and then flows into the pump passage 162. For this reason, the pressure in the pump passage 162 drops as illustrated in FIG. 4. Since the diameter of the standard orifice 522 is set to a predetermined value, as mentioned above, the pressure in the pump passage 162 drops to a predetermined value and then becomes constant. At this time, the pressure in the pump passage 162 detected by the pressure sensor 400 is recorded as standard pressure Pr in the RAM of the ECU 50. When detection of the standard pressure is completed, energization of the motor portion 220 is stopped.

(4) When the detection of the standard pressure is completed, the coil 332 of the changeover valve 300 is energized, and the depressurized state D illustrated in FIG. 4 is established. As the result of energization of the coil 332, the end 147 of the canister port 140 and the end 157 of the air port 150 are separated from each other as described above. At the same time, the canister port 140 and the connecting passage 510 are connected to each other between the ends 147 and 517. Thus, the pressure in the pump passage 162 and the pressure in the fuel tank 20 connected thereto become substantially identical, and the pressure in the pump passage 162 rises once. When the energizing and driving portion 225 of the motor portion 220 is energized at this time, the rotor 204 of the pump portion 202 is rotationally driven, and the check valve 230 is opened. As the result of the rotor 204 continuing to be rotationally driven, the interior of the fuel tank 20 connecting to the pump passage 162 is depressurized with time, as illustrated in FIG. 4.

As the rotor 204 continues to be rotationally driven, various judgments are made. When the pressure in the pump passage 162, that is, the pressure in the fuel tank 20 drops below the standard pressure Pr recorded in the step described under (3) above, the following judgment is made: the leakage of air containing fuel vapor from the fuel tank 20 is judged allowable or more favorable. When the pressure in the fuel tank 20 drops below the standard pressure Pr, that indicates the following: there is no ingress of air from the outside to the inside of the fuel tank 20 or the amount of entering air is equal to or below the flow rate of air passing through the standard orifice 522. Therefore, the hermeticity of the fuel tank 20 can be judged to have been sufficiently obtained. When the pressure in the fuel tank 20 does not drop to the standard pressure Pr, the leakage of air from the fuel tank 20 is judged to have exceeded the allowance. When the pressure in the fuel tank 20 does not drop to the standard pressure Pr, it is suspected that external air has entered with depressurization of the fuel tank. For this reason, the hermeticity of the fuel tank 20 can be judged not to have been sufficiently obtained. When the hermeticity of the fuel tank 20 is not sufficiently obtained, the following problem arise: when fuel vapor is produced in the fuel tank 20, air containing the produced fuel vapor is probably discharged out of the fuel tank 20. When the air leakage from the fuel tank 20 is judged to have exceeded the allowance, the ECU 50 lights up a warning lamp located on the dashboard (not shown) in the vehicle when the engine is operated the next time. Thus, the driver is informed that air containing fuel vapor is leaking from the fuel tank 20. When the pressure in the fuel tank 20 is substantially identical with the standard pressure Pr, that indicates that there is air leakage from the fuel tank 20 corresponding to the flow rate of air passing through the standard orifice 522.

(5) When air leakage check is completed, energization of the motor portion 220 and the changeover valve 300 is stopped, and the judgment completion state E illustrated in FIG. 4 is established. The ECU 50 confirms that the pressure in the pump passage 162 has been restored to the atmospheric pressure as illustrated in FIG. 4, and then stops energization of the pressure sensor 400 to terminate all the check steps.

In the above-mentioned embodiment, the connecting passage 510 is coaxially provided in the canister port 140. For this reason, when the connecting passage 510 is depressurized in the step described under (3) above, the following advantage is brought: the flow of air flowing from the canister port 140 opened to the air through the air port 150 into the connecting passage 510 is uniformized in the direction of the circumference of the connecting passage 510. Thus, the flow of air passing through the standard orifice 522 coaxially installed in the connecting passage 510 is also uniformized in the direction of the circumference of the standard orifice 522. As a result, the standard pressure Pr can be detected with accuracy by depressurizing the standard orifice 522; therefore, the detection accuracy for fuel vapor leakage is enhanced.

As mentioned above, a passage connects the canister port 140 to the pump passage 162 with the standard orifice 522 bypassed in the steps described under (2) and (4) above. In this embodiment, further, this passage is constructed of a portion of the connecting passage 510 located between the branching point of the pump passage 162 and the changeover valve 300. Thus, part of the connecting passage 510 in which the standard orifice 522 is installed is used also as the passage for connecting the canister port 140 to the pump passage 162 with the standard orifice 522 by passed. Therefore, the manufacturing cost can be reduced.

In this embodiment, further, the first valve seat 351 is formed on the passage wall 514 which encircles the end 517 of the connecting passage 510. At the same time, the first valve element 352 which can be seated on the first valve seat 351 is attached to the shaft body 320. The shaft body 320 coaxial with the connecting passage 510 is capable of reciprocating in the axial direction. Therefore, the connection and separation of the end 147 of the canister port 140 and the end 517 of the connecting passage 510 are implemented by the first valve portion 350. The first valve portion 350 is simply constructed by combining the first valve seat 351 and the first valve element 352. Further, the second valve element 372 of the second valve portion 370 which controls the connection and separation of the canister port 140 and the air port 150 is constructed as follows: the second valve element 372 is attached to the shaft body 320 as the same as the first valve element 352 is, and reciprocates together with the first valve element 352. For this reason, the constitution of and operation control method for the changeover valve 300 are simplified as compared with cases where the second valve element 372 is attached to a shaft body separated from the shaft body 320 and moved.

In this embodiment, further, the first valve element 352 is formed separately from the shaft body 320. Therefore, the first valve element 352 of specifications corresponding to the characteristics required of the changeover valve 300 can be formed with ease. The first valve element 352 is formed in the shape of closed-end cylinder, and the shaft body 320 is fit in the element. The bottom wall 353 is pressed against the shaft body 320 by the restoring force of the elastic member 360. Therefore, the first valve element 352 is less prone to break away from the shaft body 320. Further, the elastic member 360 is placed between the passage wall 514 and the first valve element 352, utilizing the passage wall 514 which encircles the end 517 of the connecting passage 510 provided coaxially with the shaft body 320. For this reason, the complication of constitution which otherwise results from the provision of the elastic member 360 can be avoided. In addition, the elastic member 360 constructed of a helical compression spring is provided coaxially with the connecting passage 510 and the shaft body 320. The elastic member 360 is capable of exerting substantially even restoring force on the first valve element 352 in the direction of its circumference. Thus, the effect of preventing the first valve element 352 from breaking away from the shaft body 320 is enhanced.

The embodiment described above is an example wherein the present invention is applied to a check system so designed that air leakage is inspected by depressurizing the connecting passage and thus the interior of the fuel tank. However, the present invention is applicable to a check system so designed that air leakage is inspected by pressurizing the connecting passage and thus the interior of the fuel tank.

(Second Embodiment)

Figure 6:
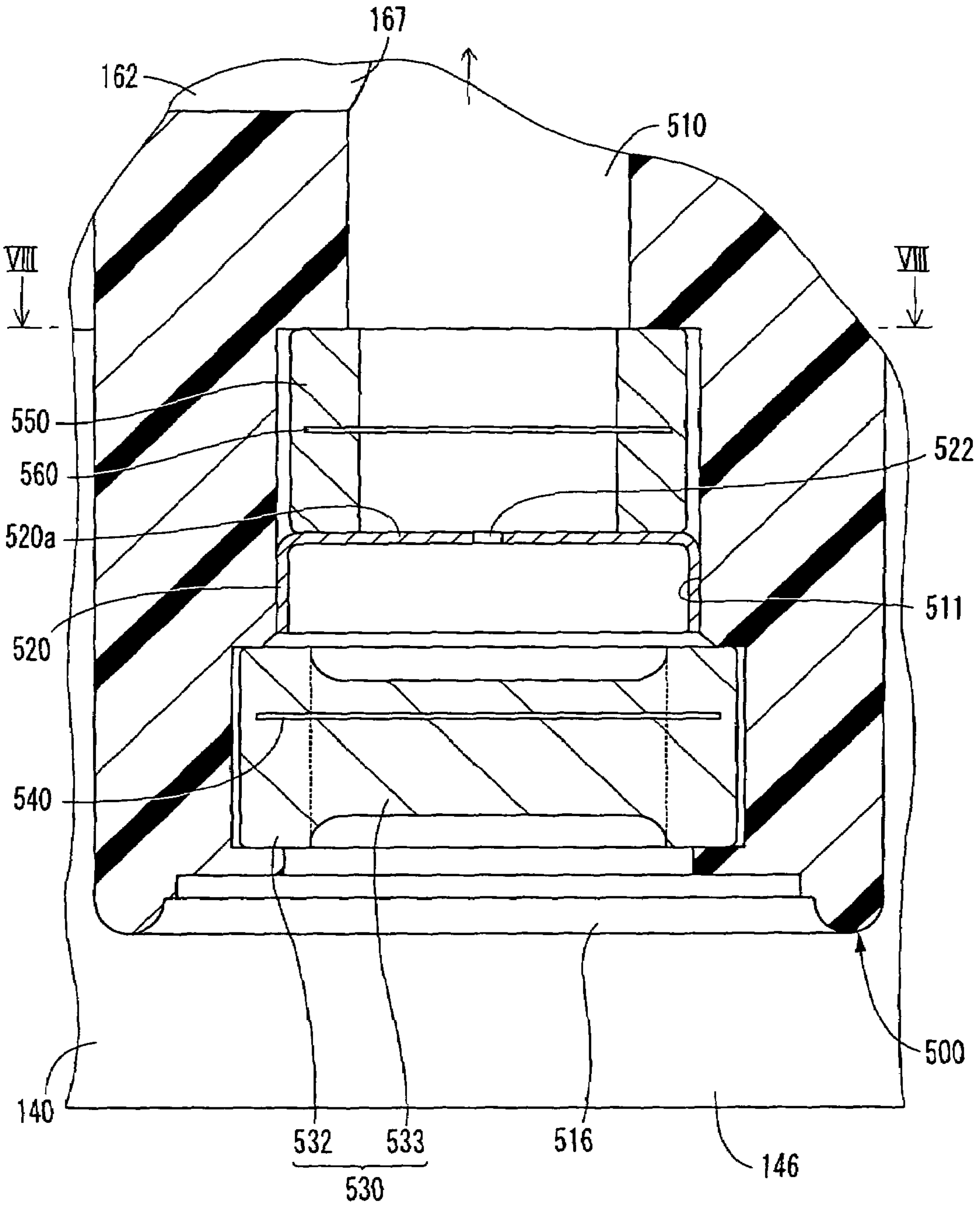
FIG. 6 is an enlarged cross-sectional view illustrating the orifice portion of a check module in a second embodiment of the present invention.
Figure 7:
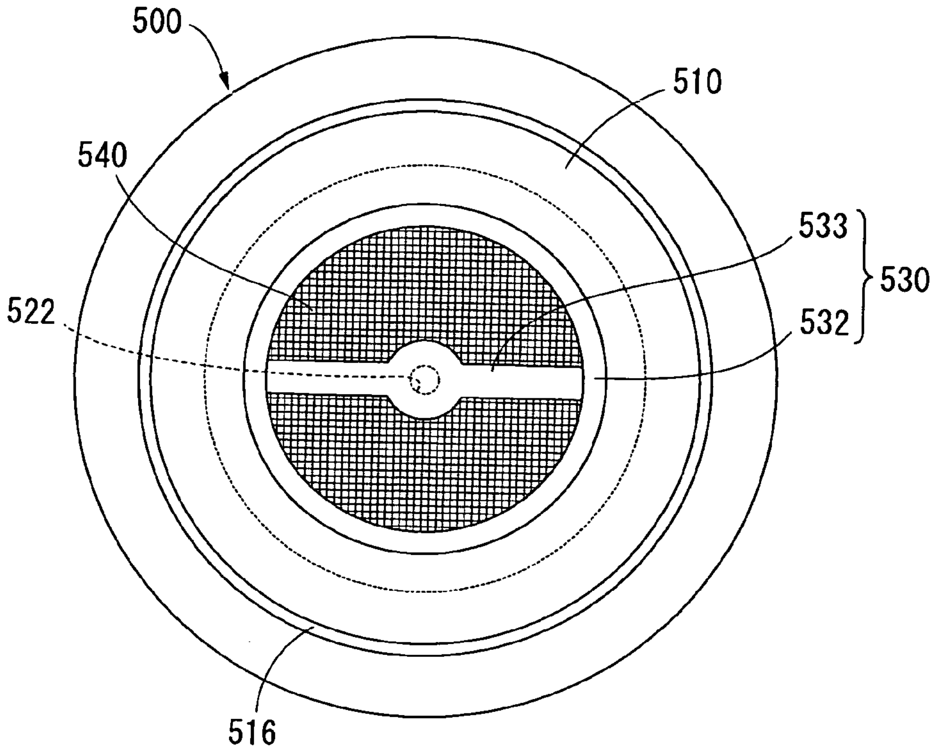
FIG. 7 is a bottom view of the orifice in the second embodiment.

As illustrated in FIG. 6, a first holding member 530 is installed in the connecting passage 510 between the standard orifice 522 and the open end. The first holding member 530 has a fitting portion 532 and a covering portion 533 integrally formed of resin. The fitting portion 532 is formed in the shape of cylinder, and is fit in the passage wall 511 of the connecting passage 510. As illustrated in FIG. 7, the covering portion 533 is formed as a flat plate which connects two points in the direction of the circumference of the fitting portion 532. Thereby, the covering portion 533 makes it difficult to view and touch the standard orifice 522 through the opening in the end 147 of the canister port 140.

The first filter 540 illustrated in FIG. 6 is formed of a thin flat metal mesh filter. The first filter 540 is insert molded into the parts 532 and 533 of the first holding member 530, and is positioned in the connecting passage 510 between the standard orifice 522 and the open end. As illustrated in FIG. 7, the first filter 540 is held in the first holding member 530 so that the gap between the inner circumferential wall of the fitting portion 532 and the outer circumferential edge of the covering portion 533 is filled therewith. The first filter 540 filters air passing through the connecting passage 510 from the open end side to the standard orifice side. Thereby, the first filter 540 prevents foreign matter in the passing air from reaching the standard orifice 522.

As illustrated in FIG. 6, a second holding member 550 is installed in the connecting passage 510 between the standard orifice 522 and the changeover valve and between the branching point of the pump passage 162 and the standard orifice. The second holding member 550 is formed of resin in the shape of cylinder, and is clamped between the passage wall 511 of the connecting passage 510 and the orifice member 520.

Figure 8:
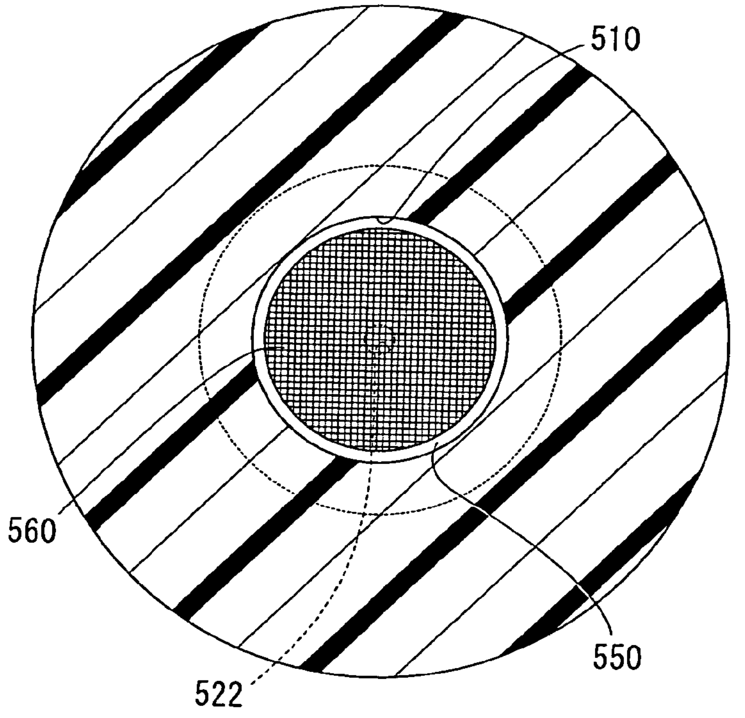
FIG. 8 is a cross sectional view along the line VIII—VIII of FIG. 6.
Figure 9:
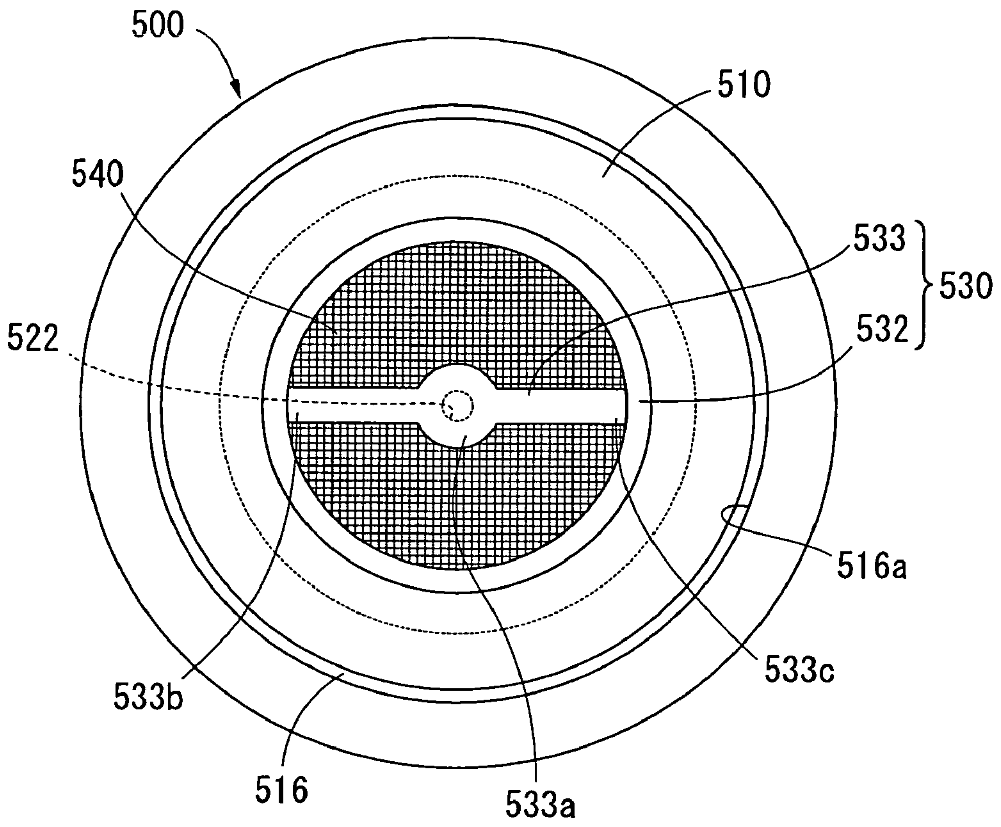
FIG. 9 is a bottom view of the orifice in the third embodiment.
Figure 10:
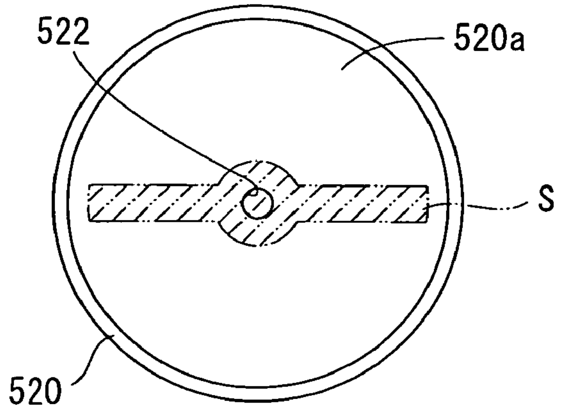
FIG. 10 is a schematic view for explaining the orifice portion in the third embodiment.

Like the first filter 540, the second filter 560 is constructed of a thin flat metal mesh filter. The second filter 560 is inserted molded into the second holding member 550, and is positioned in the connecting passage 510 between the standard orifice 522 and the changeover valve and between the branching point of the pump passage 162 and the standard orifice. That is, the second filter 560 is provided in the connecting passage 510 between the standard orifice 522 and the branching point of the pump passage 162. As illustrated in FIG. 8, the second filter 560 is held in the second holding member 550 so that the inner circumference side of the second holding member 550 is filled therewith. The second filter 560 filters air passing through the connecting passage 510 from the changeover valve side to the standard orifice side. Thereby, the second filter 560 prevents foreign mater in the passing air from reaching the standard orifice 522.

In the second embodiment described above, the filters 540 and 560 are provided on both sides of the standard orifice 522 in the connecting passage 510 both the ends 516 and 517 of which can be connected to the canister port 140. For this reason, any foreign matter, such as dust, which is caused to enter the connecting passage 510 from the canister port 140 by the flow of air undergoes filtration by the two filters 540 and 560. Thus, the foreign matter becomes less prone to reach the standard orifice 522. Therefore,the standard orifice 522 is prevented from being clogged with foreign matter which enters the connecting passage 510 from the canister port 140.

In this embodiment, foreign matter, such as abrasion dust, produced in the pump chamber 207, for example, by the vanes 209 sliding on the casing 203, can enter the connecting passage 510 from the pump passage 162. Even when this takes place, there is no problem. The second filter 560 is provided in the connecting passage 510 between the standard orifice 522 and the branching point of the pump passage 162. Therefore, the foreign matter which enters the connecting passage 510 from the pump passage 162 undergoes filtration by the second filter 560, and becomes less prone to reach the standard orifice 522. Therefore, the standard orifice 522 is prevented from being clogged with foreign matter which enters the connecting passage 510 from the pump passage 162.

In this embodiment, further, both the first filter 540 and the second filter 560 are constructed of a thin flat metal mesh filter. For this reason, provision of the filters 540 and 560 on both sides of the standard orifice 522 prevents increase in the size of the housing 110 and thus the check module 100.

In the above-mentioned embodiment, the second filter 560 is provided in the connecting passage 510 between the standard orifice 522 and the changeover valve and between the branching point of the pump passage 162 and the standard orifice. However, the second filter 560 may be provided in the connecting passage 510 between the standard orifice 522 and the branching point of the pump passage 162, and the changeover valve. Further,a plurality of second filters 560 may be used. In this case, at least one second filter 560 is provided in the connecting passage 510 between the standard orifice 522 and the changeover valve and between the branching point of the pump passage 162 and the standard orifice. At the same time, at least another second filter 560 is provided in the connecting passage 510 between the standard orifice 522 and the branching point of the pump passage 162, and the changeover valve.

In the above-mentioned embodiment, both the first filter 540 and the second filter 560 are constructed of a mesh filter. However, at least either of the first filter 540 and the second filter 560 may be constructed of a publicly known filter other than mesh filter.

The embodiment described above is an example wherein the present invention is applied to a check system so designed that air leakage is inspected by depressurizing the pump passage and thus the interior of the fuel tank. However, the present invention may be applied to a check system so designed that air leakage is inspected by pressurizing the pump passage and thus the interior of the fuel tank.

In the second embodiment described above, the connecting opening 146*a* of the canister portion 140 and the passage opening 516*a* of the connecting passage 510 face the same side. At the same time, the first filter 540 which is installed between the orifice member 520 and the passage opening is constructed of a mesh filter. For this reason, the following can be easily checked after the check module 100 is assembled: whether the orifice member 520 and the holding member 530 which holds the first filter 540 are properly installed in the connecting passage 510.

In this embodiment, the holding member 530 installed between the orifice member 520 and the passage opening is formed in such a shape that the image S of its covering portion 533 projected to the orifice side covers the entire opening in the orifice 522. For this reason, the connection between the connecting opening 146*a* and the canister 30 is released, it is significantly difficult to view and touch the orifice 522 through the connecting opening 146*a* and the passage opening 516*a*. Therefore, the orifice 522 is prevented from being improperly modified through the openings 146*a* and 516*a*.

In this embodiment, the first filter 540 is placed so that it is positioned on the passage opening side of the orifice member 520 and the gap between the fitting portion 532 of the holding member 530 fit in the connecting passage 510 and the covering portion 533 is filled therewith. For this reason, contact with the orifice 522 through the openings 146*a* and 516*a* is prevented also by the presence of the first filter 540. The effect of preventing improper modifications to the orifice 520 is enhanced.

Moreover, in this embodiment, the holding member 530 is used also as a member for installing the first filter 540 in the connecting passage 510. Therefore, the number of parts can be reduced to reduce the manufacturing cost of the check module 100.

In the above-mentioned embodiment, the covering portion 533 of the holding member 530 is formed in such a shape that the image S of the covering portion 533 projected to the orifice member side covers the entire opening in the orifice 522. However, the covering portion 533 may be formed in such a shape that the projected image S partly covers the opening in the orifice 522.

The embodiment described above is an example wherein the present invention is applied to a check system so designed that air leakage is inspected by depressurizing the connecting passage and thus the interior of the fuel tank. However, the present invention may be applied to a check system so designed that air leakage is inspected by pressurizing the connecting passage and the interior of the fuel tank.

What is claimed is:

1. A fuel vapor leak check module for detecting a fuel vapor leakage from a fuel tank, comprising:

a canister port which is installed so that the port can be opened to the air and is connected to the interior of the fuel tank through a canister for absorbing fuel vapor produced in the fuel tank;

a pump means which depressurizes or pressurizes the interior of the fuel tank through the canister port;

a connecting passage which is coaxially provided in the canister port, is connected to the canister port, and is depressurized or pressurized by the pump means; and
a standard orifice which is coaxially provided in the connecting passage and reduces the passage area of the connecting passage.

2. The fuel vapor leakage check module according to claim 1, wherein:
the canister port has a connecting end portion connected to the canister; and
the connecting passage has an open end open in the canister port; and further comprising:
an air port which has an open end opened to the air; and
a changeover valve which selects the counter-open end-side end of the connecting passage or the counter-open end-side end of the air port, and connects it to the counter-connecting end portion-side end of the canister port; wherein
the pump means has a pump passage branching from the connecting passage between the standard orifice and the changeover valve, and depressurizes or pressurizes the pump passage.

3. A fuel vapor leakage check module for detecting a fuel vapor leakage from a fuel tank, comprising:
a canister port which is installed so that the port can be opened to the air and is connected to the interior of the fuel tank through a canister for absorbing fuel vapor produced in the fuel tank;
a pump means which depressurizes or pressurizes the interior of the fuel tank through the canister port;
a connecting passage which is coaxially provided in the canister port, is connected to the canister port, and is depressurized or pressurized by the pump means;
a standard orifice which is coaxially provided in the connecting passage and reduces the passage area of the connecting passage;
an air port which has an open end opened to the air; and
a changeover valve which selects the counter-open end-side end of the connecting passage or the counter-open end-side end of the air port, and connects it to the counter-connecting end portion-side end of the canister port, wherein
the canister port has a connecting end portion connected to the canister,
the connecting passage has an open end open in the canister port,
the pump means has a pump passage branching from the connecting passage between the standard orifice and the changeover valve, and depressurizes or pressurizes the pump passage,
the changeover valve comprises: a shaft body installed so that the body is coaxial with the connecting passage and can be reciprocated in the axial direction; a first valve portion which connects or separates the counter-open end-side end of the connecting passage and the counter-connecting end portion-side end of the canister port; and a second valve portion which connects or separates the counter-open end-side end of the air port and the counter-connecting end portion-side end of the canister port, and
the first valve portion is constructed by combining a first valve seat formed on a passage wall which encircles the counter-open end-side end of the connecting passage, and a first valve element provided on the shaft body so that the first valve element can be seated on the first valve seat.

4. The fuel vapor leakage check module according to claim 3,
wherein the second valve portion is constructed by combining a second valve seat and a second valve element formed on the shaft body so that the second valve element can be seated on the second valve seat.

5. The fuel vapor leakage check module according to claim 3,
wherein the changeover valve has an elastic member placed between the passage wall and the first valve element, and
wherein the first valve element is formed in the shape of closed-end cylinder, the connecting passage-side end of the shaft body is attached to the inner radius side of the first valve element by fitting, and the bottom wall of the first valve element is pressed against the shaft body by the restoring force of the elastic member.

6. The fuel vapor leakage check module according to claim 5,
wherein the elastic member is constructed of a helical compression spring and is provided coaxially with the connecting passage and the shaft body.

7. A fuel vapor leakage check module for detecting a fuel vapor leakage from a fuel tank, comprising:
a canister port which is installed so that the port can be opened to the air and is connected to the interior of the fuel tank through a canister for absorbing fuel vapor produced in the fuel tank;
a pump means which depressurizes or pressurizes the interior of the fuel tank through the canister port, wherein the pump means has a pump passage branching from the connecting passage between the standard orifice and a changeover valve and depressurizes or pressurizes the pump passage;
a connecting passage which is coaxially provided in the canister port, is connected to the canister port, and is depressurized or pressurized by the pump means;
a standard orifice which is coaxially provided in the connecting passage and reduces the passage area of the connecting passage;
a first filter which is provided in the connecting passage between the standard orifice and an open end of the connecting passage and filters fluid passing through the connecting passage; and
a second filter which is provided in the connecting passage between the standard orifice and the changeover valve and filters fluid passing through the connecting passage.

8. The fuel vapor leakage check module according to claim 7,
wherein the second filter is provided in the connecting passage between the branching point of the pump passage and the standard orifice.

9. The fuel vapor leakage check module according to claim 7,
wherein both the first filter and the second filter are constructed of a mesh filter.

10. A fuel vapor leakage check module for detecting a fuel vapor leakage from a fuel tank, comprising:
a canister port which is installed so that the port can be opened to the air and is connected to the interior of the fuel tank through a canister for absorbing fuel vapor produced in the fuel tank;

a pump means which depressurizes or pressurizes the interior of the fuel tank through the canister port;

a connecting passage which is coaxially provided in the canister port, is connected to the canister port, and is depressurized or pressurized by the pump means;

an orifice member which coaxially provided in the connecting passage and has a standard orifice for reducing the passage area of the connecting passage; and a holding member which is installed in the connecting passage between the orifice member and the passage opening and whose image projected to the orifice member side overlaps the opening in the orifice.

11. The fuel vapor leakage check module according to claim 10, wherein the holding member is formed in such a shape that the projected image covers the entire opening in the orifice.

12. The fuel vapor leakage check module according to claim 10, further comprising:

filters which are held in the holding member and filter fluid passing through the connecting passage.

13. The fuel vapor leakage check module according to claim 12, wherein the filters are mesh filters.

* * * * *